United States Patent [19]

Dietzsch

[11] Patent Number: 4,840,224

[45] Date of Patent: Jun. 20, 1989

[54] DEVICE FOR TRANSFERRING HEAT ENERGY BY CAPILLARY FORCES

[75] Inventor: Claudius R. Dietzsch, Stein am Rhein, Switzerland

[73] Assignee: Sig Schweizerische Industrie-Gesellschaft, Neuhausen am Rheinfall, Switzerland

[21] Appl. No.: 187,311

[22] Filed: Apr. 28, 1988

[30] Foreign Application Priority Data

Apr. 28, 1987 [CH] Switzerland .......................... 1631/87

[51] Int. Cl.⁴ ............................................. F28D 15/02
[52] U.S. Cl. .................................. 165/104.26; 165/47;
219/244; 219/530; 53/373; 156/583.1
[58] Field of Search .............................. 165/104.26, 47;
219/244, 530; 53/373; 156/583.1

[56] References Cited

U.S. PATENT DOCUMENTS

| | | |
|---|---|---|
| 2,350,348 | 6/1944 | Gaugler . |
| 3,152,774 | 10/1964 | Wyatt . |
| 4,018,269 | 4/1977 | Honda et al. .................... 165/104.26 |
| 4,046,190 | 9/1977 | Marcus et al. .................. 165/104.26 |
| 4,288,968 | 9/1981 | Seko et al. ............................ 53/550 |
| 4,455,808 | 6/1984 | Netzhammer ......................... 53/373 |
| 4,737,231 | 4/1988 | Seko et al. ....................... 165/104.26 |

Primary Examiner—Albert W. Davis, Jr.
Attorney, Agent, or Firm—Spencer & Frank

[57] ABSTRACT

A heat energy transfer device has an enclosure defining a closed cavity and including an outer face to be heated or cooled. A heat transfer medium is contained in the cavity. The device has a first capillary arrangement disposed in the cavity for advancing the heat transfer medium in the liquid phase in a first direction parallel to the outer face of the enclosure and a second capillary arrangement disposed in the cavity for advancing the heat transfer medium in the liquid phase in a second direction parallel to the outer face of the enclosure. The first and second directions are non-parallel to one another.

10 Claims, 2 Drawing Sheets

DEVICE FOR TRANSFERRING HEAT ENERGY BY CAPILLARY FORCES

BACKGROUND OF THE INVENTION

This invention relates to a device for transferring heat energy to heat or cool a surface.

It is known to transfer heat energy over a distance. For example, in U.S. Pat. No. 2,350,348 a rod-like heat conducting device is described. The arrangement disclosed therein is based on the principle that heat may be transferred in a closed system which is partially filled with a vaporizable liquid. At one location of the device, heat is absorbed by vaporizing the liquid and at another location, remote from the first location, such heat is released by condensation. The vaporization of the liquid, that is, the absorption of heat takes place conventionally at a location which is situated below the height level of the location where the condensation (that is, the heat release) is taking place. In order to change this natural circulation, the above-noted United States patent proposes the use of a heat transfer element which is a closed tube having an internal capillary structure formed, for example, of sintered iron powder which, dependent upon the liquid to be used or the height to which the heat has to be transferred, may be mixed with other substances. For example, in a refrigerator, by virtue of such an arrangement heat may be transferred downwardly from above, and cold may be transferred upwardly from below.

A similar arrangement is disclosed in U.S. Pat. No. 3,152,774. In manmade satellites, a cooling system must be provided for that face of the solar panels which are turned towards the sun. The solar panels, in order to reduce their weight, should contain only as much metal as necessary for ensuring stability of the structure. Water, methyl chloride or a Freon may be used as the heat transfer medium. The heat transfer medium is advanced from a central reservoir by means of a fiber-like material which lines the pipe system and the reservoir and which acts as a wick to advance the liquid to the location of use, that is, the location where a vaporization takes place. Such an arrangement is expedient primarily because the system is in a weightless state and consequently it is not necessary to overcome the weight of the liquid during its transfer.

Similar problems are involved in the field of machinery. Either heat should be transferred from a heating element to a heating surface, such as in heat sealing shoes in packing machines which work on heat-sealable wrapper material or heat should be removed from a working location such as high precision machine tools or the like. Problems involved in such an application are addressed in U.S. Pat. No. 4,288,968 which discloses a system wherein the sealing face of a heat sealing shoe is heated by means of a condensating gas. The gas is confined to a cavity or a closed pipe system between the heat elements and the sealing face. At all times a sump of condensated liquid is present which gathers at the lowest location due to gravity. Consequently, the heating mechanism should be arranged at such lowest location. The sealing shoes, however, are in most cases rotary structures so that the sump, because of centrifugal forces, is at a different location.

SUMMARY OF THE INVENTION

It is an object of the invention to provide an improved heat transfer device whose operation depends neither on gravity nor on any other determined force.

This object and others to become apparent as the specification progresses, are accomplished by the invention, according to which, briefly stated, the heat energy transfer device has an enclosure defining a closed cavity and including an outer face to be heated or cooled. A heat transfer medium is contained in the cavity. The device has a first capillary arrangement disposed in the cavity for advancing the heat transfer medium in the liquid phase in a first direction parallel to the outer face of the enclosure and a second capillary arrangement disposed in the cavity for advancing the heat transfer medium in the liquid phase in a second direction parallel to the outer face of the enclosure. The first and second directions are non-parallel to one another.

DESCRIPTION OF THE PREFERRED EMBODIMENTS

Figure 1:
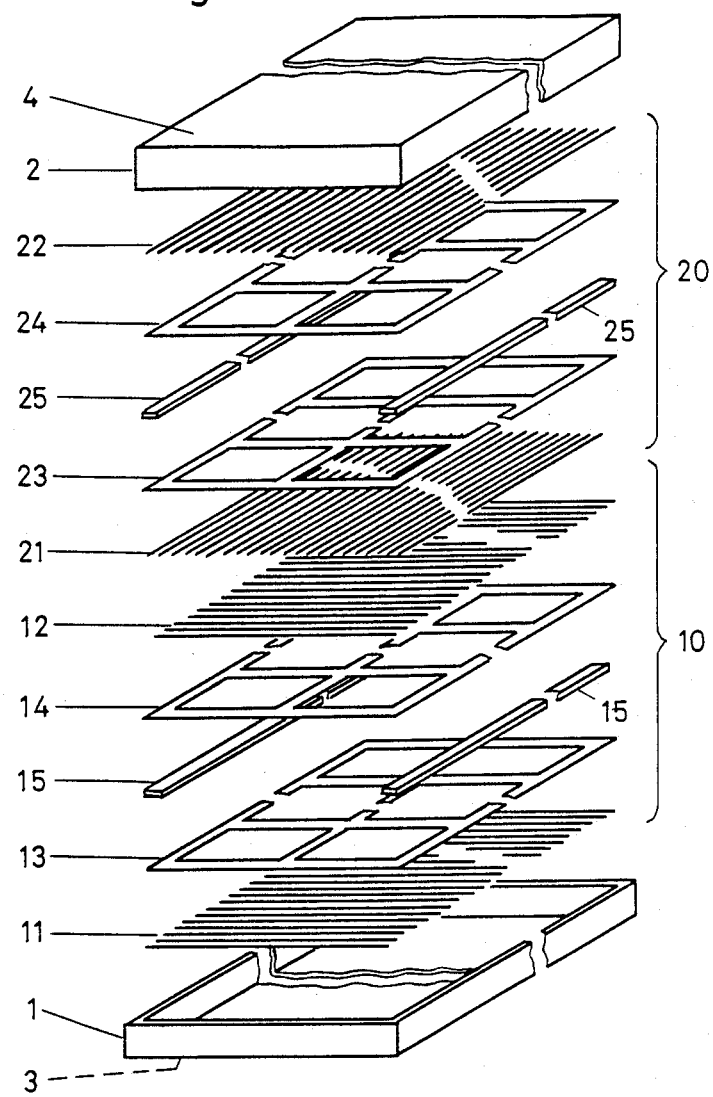
FIG. 1 is a schematic perspective exploded view of a preferred embodiment of the invention.
Figure 2:
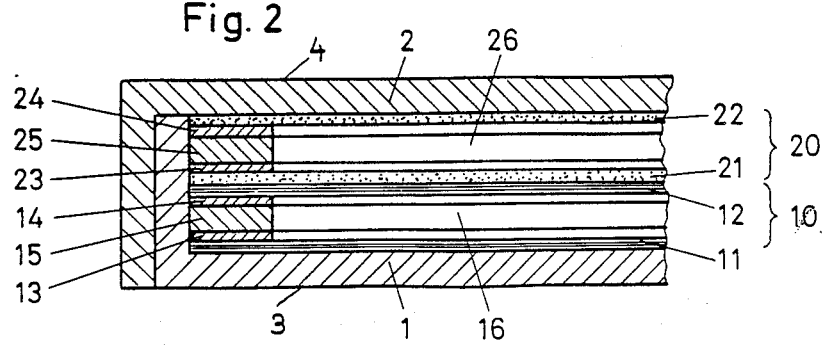
FIG. 2 is an enlarged sectional elevational view of the preferred embodiment.

Turning to FIGS. 1 and 2, there is provided a housing formed of sealingly interfittable shells 1 and 2. Each shell has a reactangular base wall, forming the top and the bottom of the housing, respectively. The bottom and top wall has respective outer faces 3 and 4 serving as heating or cooling surfaces. In the housing 1, 2 there are accommodated two heat conducting systems 10 and 20 for transferring a vaporizable liquid in a direction parallel to the faces 3 and 4. Each of the heat conducting systems 10 and 20 has two mutually spaced capillary structures 11, 12 and 21, 22, respectively. In the illustrated embodiment, the capillary structures are each formed of an array of very thin wires (having a diameter of, for example, not exceeding 0.1 mm) which are spread out in a plane such that the intermediate spaces between adjoining wires form capillary tubes in which the liquid may move by virtue of capillary forces.

In order to maintain the wires of the wire arrays in a spread-out condition, there are provided two grid-like holder frames 13, 14 and 23, 24 for the conductor systems 10 and 20, respectively, which are positioned at a distance from one another by spacer strips 15 and 25. If the holder frames 13, 14, 23, 24, are so structured that they are capable of maintaining the wires in their position and preventing them from sagging, one pair of spacers 15, 25 suffices at opposite side walls of the housing as shown. Between the holder frames 11, 12 and between the holder frames 21, 22 respective spaces 16 and 26 are defined.

As may be observed in FIGS. 1 and 2, the capillary structures 11, 12 and 21, 22 of the two conductor systems 10, 20 are offset at 90° with respect to one another.

In the description which follows, the operation of the heat transfer device will be described with particular reference to FIG. 2.

In case of a saturated capillary system, thin liquid layers lie on the capillary structures 11, 21. Upon a heating in the left portion of the construction as viewed in FIG. 2, the liquid vaporizes in the capillary structures at that location. By virtue of the pressure differential that has developed due to the vaporizaton, the vapor moves in the spaces 16, 26 - which serve as vapor transfer chambers - to the colder, non-illustrated right-hand part of the housing, where it is condensated and thus heats the shells 1 and 2 at the right-hand portion thereof. In this manner, a temperature equalization in the shells 1 and 2 is obtained. The condensate is moved back into the left part of the housing 1, 2 by capillary forces in the capillary structures 11, 12.

Figure 3:
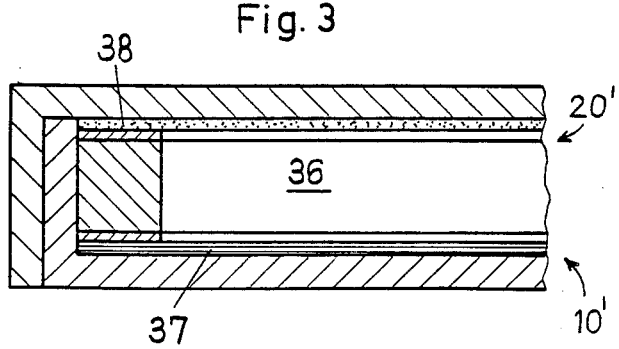
FIG. 3 is an enlarged sectional elevational view of another preferred embodiment of the invention.

Turning now to the embodiment illustrated in FIG. 3, each heat transfer system 10', 20' has but a single capillary structure 37, 38 which are, similarly to the embodiment of FIGS. 1 and 2, oriented at 90° to one another and between which a vapor transfer chamber 36 is defined.

It will be readily understood that the orientations described above may be varied, as requirements dictate. The heat is transferred in every direction between a heat generator and a consumer, that is, for example, also transversely across the housing between two oppositely located end faces. By virtue of the directional capillary forces the condensated liquid is transferred back to the vaporizing zone.

Figure 4:
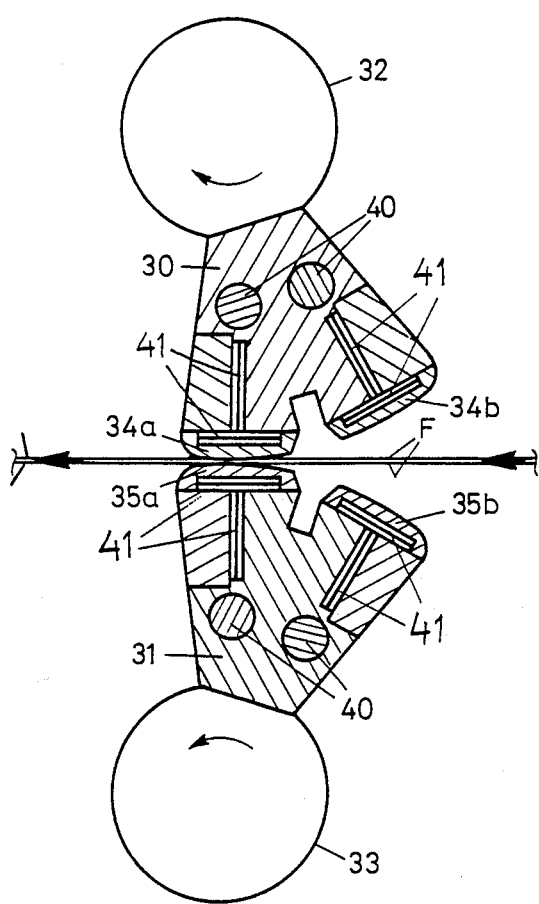
FIG. 4 is a sectional side elevational view of cooperating rotary sealing shoe pairs incorporating the invention.

Turning now to FIG. 4, there is schematically illustrated therein a sealing station of a packing machine for sequentially making two spaced transverse sealing seams on heat-sealable superposed wrapper sheets. For this purpose, there are provided two sealing shoes 30, 31 secured to two oppositely rotating spaced shafts 32 and 33. The sealing faces 34a, 34b and 35a, 35b rollingly engage while the superposed heat-sealable films F pass therebetween. As the mutually cooperating sealing shoes contact, they engage the film on opposite sides and seal them together. Such sealing shoes are known in general and are described, for example, in U.S. Pat. No. 4,455,808.

For the heating of the sealing shoes heating bars 40 are provided which are arranged parallel to the rotary axis within the sealing shoes, that is, parallel to the sealing faces. By virtue of such a conventional arrangement, the heat energy propagates in every direction in the entire sealing shoe.

By incorporating the heat energy transfer device according to the invention in the sealing shoes 30 and 31, a directional, more channelled heat energy transfer to the heat sealing faces of the sealing shoes may be effected.

In the construction shown in FIG. 4, for each sealing face 34a, 34b, 35a, 35b there is provided a radial and a tangential heat energy transfer device 41 according to the invention for transferring the heat energy. In this manner, the heat is, from the heating bars 40, transferred in a purposeful manner to the location of utilization and is, on the heating faces uniformly distributed over the entire face of the housing and transferred to the sealing faces. It is to be understood that the adjoining radial and tangential heat energy transfer devices - each structured, for example, according to FIG. 2 - are so dimensioned that the sealing face of the sealing shoes is uniformly heated. It is feasible to provide more than two - and accordingly smaller-devices in each sealing shoe.

Figure 5:
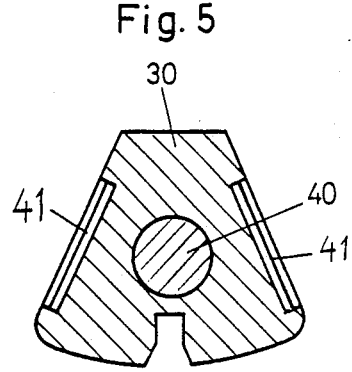
FIGS. 5, 6 and 7 are sectional side elevational views of three variants of a component of the construction shown in FIG. 4.

In FIG. 5 there is shown a sealing shoe variant which has two lateral, radially arranged heat energy transfer devices 41 according to the invention.

Figure 6:
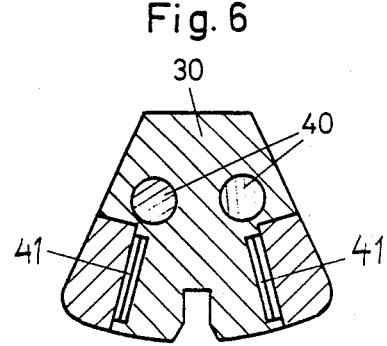

In the FIG. 6 variant, similarly to FIG. 5, two radially arranged heat energy transfer devices 41 are provided. These, however, are situated inside the sealing shoe, in radial alignment with the one and the other heating bar 40.

Figure 7:
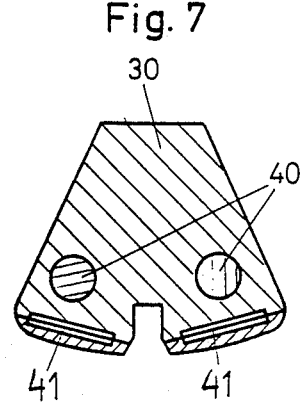

In the variant illustrated in FIG. 7, two tangentially arranged heat energy transfer devices 41 according to the invention are provided in the immediate vicinity of the working faces of the sealing shoes. The two devices are associated with the one and the other heating bar 40.

The present disclosure relates to subject matter contained in Swiss Patent Application No. 1631/87-6 (filed Apr. 28th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. A heat energy transfer device for heating or cooling a surface, comprising
   (a) wall means defining a closed cavity; said wall means having an outer face constituting said surface;
   (b) a heat transfer medium contained in said cavity and having a liquid phase;
   (c) a first capillary means disposed in said cavity for advancing said heat transfer medium in said liquid phase in a first direction parallel to said surface; said first capillary means including two superposed first arrays of parallel-arranged, spaced wires extending generally two-dimensionally in respective planes oriented parallel to said surface; said first arrays having respective sides oriented towards one another; and first supporting spacer means positioned between said first arrays for maintaining the first arrays in position and for providing a space therebetween; and
   (d) a second capillary means disposed in said cavity for advancing said heat transfer medium in said liquid phase in a second direction parallel to said surface; said first and second directions being nonparallel to one another; said second capillary means including two superposed second arrays of parallel-arranged, spaced wires extending generally two-dimensionally in respective planes oriented parallel to said surface; said second arrays having respective sides oriented towards one another; and second supporting spacer means positioned between said second arrays for maintaining the second arrays in position and for providing a space therebetween.

2. A heat energy transfer device as defined in claim 1, wherein said wall means define a housing of flat, platelike configuration; said outer face being two in number and being constituted by opposite, parallel oriented outer sides of said housing; said first and second capillary means extending parallel to said outer sides.

3. A heat energy transfer device as defined in claim 1, wherein said first and second directions are oriented at 90° to one another.

4. A heat energy transfer device as defined in claim 1, wherein said first and second capillary means are superposed and extend generally two-dimensionally in respective planes oriented parallel to said surface.

5. A heat energy transfer device as defined in claim 4, wherein said heat transfer medium has a vapor phase; further wherein said first and second capillary means are spaced from one another and together define a space in which the heat transfer medium can propagate in said vapor phase.

6. A heat energy transfer device as defined in claim 1, wherein said first and second supporting spacer means comprise spacer strips extending along edge zones of respective first and second said arrays and holder frames separating the spacer strips from each array and supporting each array over a substantial area thereof.

7. A heat energy transfer device as defined in claim 1, wherein said wires has a diameter of 0.1 mm at the most.

8. A heat energy transfer device for heating or cooling a surface, in combination with a rotary heat-sealing shoe for a packing machine;
   said heat-sealing shoe comprising
   a rotary axis;
   a heating bar positioned inside the sealing shoe and having a length;
   a work face for contacting a substance to be sealed by heat; said work face being oriented parallel to the length of the heating bar;
   at least one said heat energy transfer device being arranged within said sealing shoe between said heating bar and said work face;
   said heat energy transfer device comprising
   wall means defining a closed cavity; said wall means having an outer face constituting said surface; said outer face being parallel to said work face of said sealing shoe;
   a heat transfer medium contained in said cavity and having a liquid phase;
   a first capillary means disposed in said cavity for advancing said heat transfer medium in said liquid phase in a first direction parallel to said surface; and
   a second capillary means disposed in said cavity for advancing said heat transfer medium in said liquid phase in a second direction parallel to said surface; and first and second directions being non-parallel to one another.

9. A heat energy transfer device for heating or cooling a surface, in combination with a rotary heat-sealing shoe for a packing machine;
   said heat-sealing shoe comprising
   a rotary axis;
   a heating bar positioned inside the sealing shoe and having a length;
   a work face for contacting a substance to be sealed by heat; said work face being oriented parallel to the length of the heating bar;
   at least one said heat energy transfer device being arranged within said sealing shoe between said heating bar and said work face;
   said heat energy transfer device comprising
   wall means defining a closed cavity; said wall means having an outer face constituting said surface; said outer face being perendicular to said work face of said sealing shoe;
   a heat transfer medium contained in said cavity and having a liquid phase;
   a first capillary means disposed in said cavity for advancing said heat transfer medium in said liquid phase in a first direction parallel to said surface; and
   a second capillary means disposed in said cavity for advancing said heat transfer medium in said liquid phase in a second direction parallel to said surface; said first and second directions being non-parallel to one another.

10. A heat energy transfer device as defined in claim 9, wherein an additional said heat energy transfer device is situated in said sealing shoe between said heating bar and said work face; the outer face of the additional heat energy transfer device is oriented parallel to the work face of said heat sealing shoe.

* * * * *